United States Patent [19]

Grosvernier

[11] 4,277,176
[45] Jul. 7, 1981

[54] METHOD AND APPARATUS FOR CHECKING THE WIDTH AND PARALLELISM OF MARGINS FOLLOWING THE CENTERING OF A PRINT WITH RESPECT TO A SUPPORT

[75] Inventor: Claude-Arnold Grosvernier, Hauterive, Switzerland

[73] Assignee: Compagnie Industrielle Radioelectrique, Gals, Switzerland

[21] Appl. No.: 957,345

[22] Filed: Nov. 3, 1978

[30] Foreign Application Priority Data

Nov. 4, 1977 [CH] Switzerland ............ 13418/77

[51] Int. Cl.³ .................. G01B 11/00; G01B 11/14
[52] U.S. Cl. ............................ 356/394; 250/561; 356/375
[58] Field of Search .......... 356/394, 375, 400, 373, 356/384–387; 250/578, 561, 471, 224, 202

[56] References Cited

U.S. PATENT DOCUMENTS

| 2,840,722 | 6/1958 | Frommer | 250/202 |
| 3,883,816 | 9/1974 | Emura et al. | 250/561 |

Primary Examiner—John K. Corbin
Assistant Examiner—Wm. H. Punter
Attorney, Agent, or Firm—Robert E. Burns; Emmanuel J. Lobato; Bruce L. Adams

[57] ABSTRACT

A method and apparatus for checking the width and parallelism of margins following the centering of a print with respect to a support, wherein the support is moved in front of opto-electronic reading devices such that the margins extend parallel to the direction of movement. A number n of photosensitive member are distributed in a linear manner transversely with respect to the direction of movement of the support, the number of sensitized photosensitive members of the reading devices producing a signal greater than a threshold level is counted for each margin, the number of members counted is compared with a reference value, and the difference between the numbers of members counted at two different points of each margin is compared with a reference value. The first comparison provides a measure of the width of the margin, and the second comparison provides a measure of the parallelism of the margins.

7 Claims, 10 Drawing Figures

METHOD AND APPARATUS FOR CHECKING THE WIDTH AND PARALLELISM OF MARGINS FOLLOWING THE CENTERING OF A PRINT WITH RESPECT TO A SUPPORT

FIELD OF INVENTION

The present invention relates to a method and apparatus for checking the width and parallelism of margins following the centering of a print with respect to a support, for example a sheet. The support is moved in front of opto-electronic reading devices with the margins extending parallel to the direction of movement of the support.

BACKGROUND OF THE INVENTION

It has already been proposed to scan a side margin by means of a light beam and to detect the light reflected in order to define a square wave pulse whose edges are differentiated between in order to define the edges of the margin. The accuracy of such a method is relatively low. Furthermore, this method does not enable parallelism to be checked.

It has also been proposed to check the width of the margin by means of optic fibres, the measurement consisting of counting the number of optic fibres illuminated and of comparing this number with a reference value. However, the power of resolution of such a measuring apparatus is relatively low on account of the dimension of the optic fibres. The measurement is thus inaccurate. Furthermore, it is necessary to have one detector per optic fibre. Finally, parallelism is not checked.

SUMMARY OF THE INVENTION

It is an object of the present invention to increase the accuracy and speed of measurement and to check the width of the margins and the parallelism of each of these margins with the edges of the support.

According to the present invention there is provided a method for checking the width and parallelism of margins following the centering of a print with respect to a support, wherein the support is moved in front of opto-electronic reading devices such that the margins extend parallel to the direction of movement, characterized in that n photo-sensitive members are distributed in a linear manner transversely with respect to the direction of movement of the support, the number of sensitized photo-sensitive members of the reading devices producing a signal greater than a threshold level is counted for each margin, the number of members counted is compared with a reference value, and the difference between the numbers of members counted at two different points of each margin is compared with a reference value.

The invention also provides an apparatus for checking the width and parallelism of margins following the centering of a print with respect to a support, comprising opto-electronic reading devices, and means for moving the support in front of the reading devices such that the margins extend parallel to the direction of movement, characterized in that the opto-electronic reading devices comprise n photo-sensitive members distributed in a linear manner transversely with respect to the direction of movement of the support, means being provided to count the number of sensitized photo-sensitive members producing a signal greater than a threshold level, to compare the number of members counted with a reference value, and to compare the difference between the number of members counted at two different points of each margin with a reference value.

Preferably the apparatus is characterized in that for each margin, it comprises a camera comprising a predetermined number of photo-diodes and equipped with a comparison device having an adjustable threshold which is self-adjusting as regards the illumination of the margins, means for generating an authorization signal from the envelope of signals from the photodiodes exceeding the threshold, which signal is used to inhibit or not to inhibit the counting means, a first counter for counting the photodiodes supplying signals greater than the threshold during the authorisation signal, a second counter counting the photodiodes supplying signals less than the threshold and triggered by the first counter, registers containing the reference values a comparator for comparing the number of diodes counted with a reference value corresponding to the maximum authorized margin width, a comparator for comparing the number of diodes counted with a reference value corresponding to the minimum authorized margin width, and a comparator comparing the differences between the numbers of diodes counted at two points located at a distance apart with a reference value corresponding to the tolerance of non-parallelism.

The user of a RETICON camera having a high power of resolution makes it possible to carry out very accurate measurement at high speed.

DESCRIPTION OF DRAWINGS

The accompanying drawings illustrate one embodiment of the invention, by way of example. In the drawings.

DESCRIPTION OF PREFERRED EMBODIMENT

Figure 1:
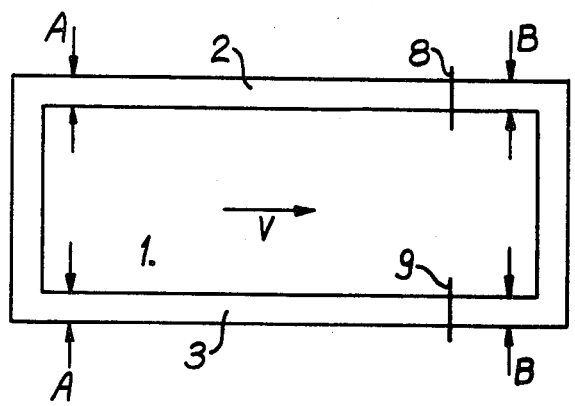
FIG. 1 illustrates the general principle of measurement employed in accordance with the invention.

FIG. 1 shows diagrammatically a rectangular sheet of paper comprising a printed part 1 and two side margins 2 and 3. With the sheet travelling at a speed of 6.6 meters per second in the direction of arrow V, the widths of the two side margins are measured simultaneously at two points B near the leading end of the sheet and at two points A near the trailing end of the sheet. These two measurements are also used for checking the parallelism of the margins, i.e. the parallelism between the edge of the sheet and the edge of the printed part, as will be described hereafter.

Figure 2:
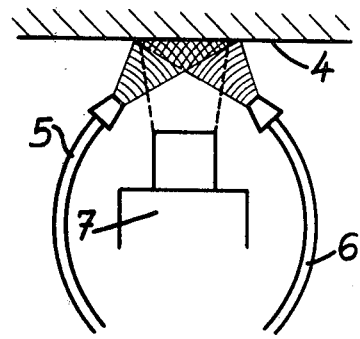
FIG. 2 shows diagrammatically the "sensor" part of a camera used in accordance with the invention.

To carry out these measurements, an electronic camera of the RETICON type is used which is located as shown diagrammatically in FIG. 2. The surface of the sheet 4 is illuminated from a light source (not shown) by means of two semi-flexible light guides or optic fibres 5, 6. The camera 7 is located on the same side of the sheet 4 as the light source. Light reflected by the sheet is thus measured.

Figure 3:
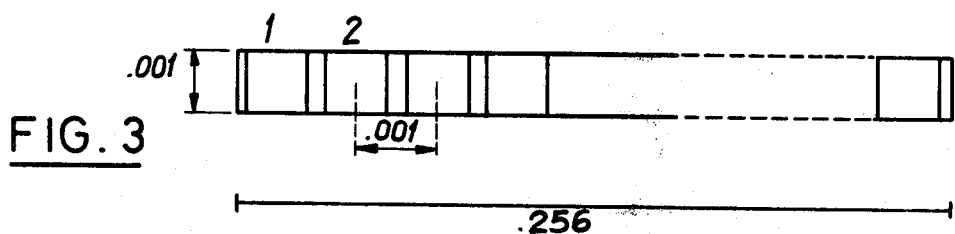
FIG. 3 illustrates the structure of the camera.
Figure 4:
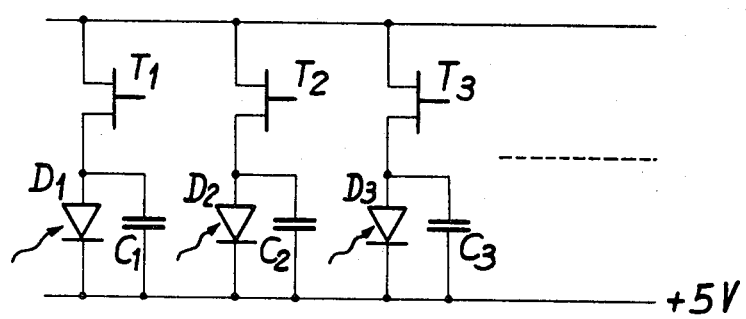
FIG. 4 illustrates diagrammatically the arrangement of electronic components in the camera.
Figure 7:
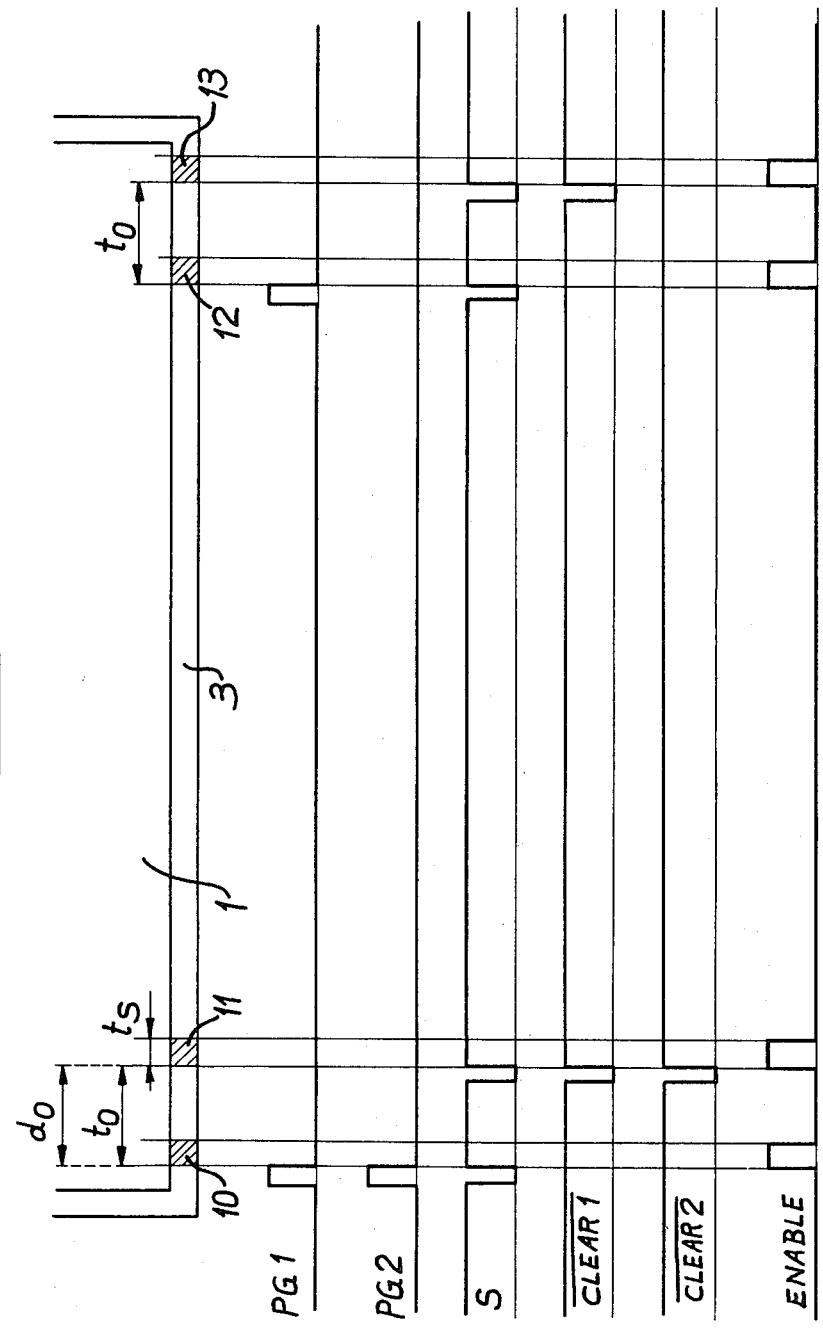
FIG. 7 is a diagram illustrating the timing of functions in the apparatus.

The sensitive part of the camera, known per se, is formed by a line of 256 photo-sensitive elements comprising photodiodes spaced apart by 0.001 inches (FIG. 3). The total length of the sensitive member is thus 0.256 inches or 6.5 mm. As shown diagrammatically in FIG. 4, each photodiode $D_1$, $D_2$, $D_3$ etc. is connected in series with a transistor such as $T_1$, $T_2$, $T_3$, etc. between a voltage source supplying $+5$ V and a virtual earth and in parallel with a capacitor such as $C_1$, $C_2$, $C_3$, etc. Initially, each capacitor is charged with a voltage of $-5$ V. Whilst the corresponding transistor is blocked, the capacitor is discharged by reverse current through the diode. This reverse current is composed of two components, namely the photo-current and the leakage current of the diode, the latter being negligible. The photo-current is integrated during a predetermined and constant time to obtain the product of the sensitivity of the diode and the light intensity. The charge taken from the capacitor is thus the product of the photo-current and the time elapsing between two successive re-charges of the capacitor. The signal obtained by means of each of the camera, or the video signal, represents the recharging current of the capacitor at the time of sampling. Thus, the amplitude of the video signal is proportional to the time between two sampling operations and to the light intensity. The transistors $T_1$, $T_2$, $T_3$ etc. serve as circuit-breakers for re-charging the capacitors respectively associated therewith. In FIG. 1, the sensitive part of the cameras or "sensor", is illustrated diagrammatically at 8 and 9. The cameras are adjusted in order that the sensors "see" a distance of 10 mm, the cameras being positioned such that the margin is at the centre of the field of vision of the cameras. In view of the fact that a distance of 10 mm is "seen" by 256 photodiodes, one photodiode sees a distance of 39.6 μm. We thus have a resolution of 39 μm. The amplitude of the video signal of each of the diodes is proportional to the light intensity and to the time between two recharges of the capacitors. In fact, it is proportional to the charge, thus to the integration of the photo-current during a time $t_o$ (FIG. 7). In the present application, the integration time $t_o$ is the same for each diode, but each diode sees a different part of the sheet. Furthermore, the integration time is always the same and it is short in order that the distance travelled by the sheet during time $t_o$ remains as small as possible. Initiation is effected, i.e. the capacitors are recharged, before each measurement. It is then necessary to initiate scanning of the camera. In FIG. 7, the duration of scanning is designated by $t_s$, the scanning itself being represented by shaded areas on the margin 3 of the sheet. The shaded areas 10 and 12 correspond to initiation, i.e. to recharging of the capacitors, whereas the regions 11 and 13 represent the times during which measurement of the result of the integration of the light reflected by the sheet during the time $t_o$ and over the distance $d_o$ is carried out.

Figure 6:
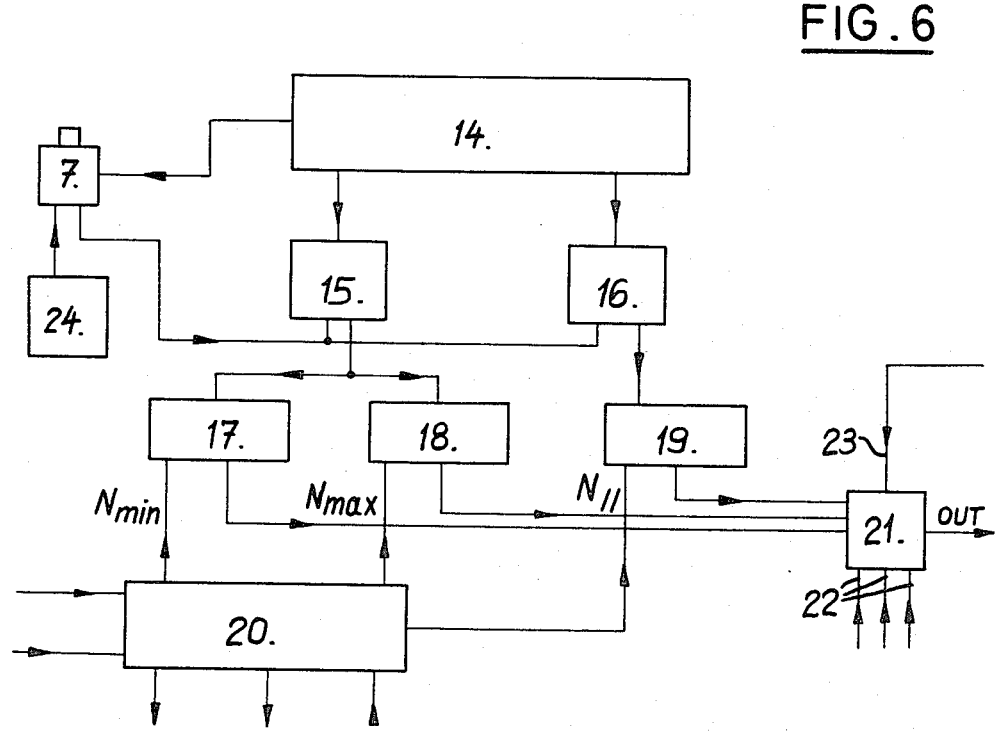
FIG. 6 is a simplified block diagram of a checking device for one of two cameras.

The simplified block diagram for checking one of the margins is illustrated in FIG. 6. The apparatus comprises the camera 7, control logic 14, a first diode counter 15, a second diode counter 16, three comparators 17, 18 and 19, a data pre-selection circuit 20 and a processing circuit 21 for processing the data received. The circuit 21 also receives at inputs 22 data from the circuit associated with the second camera. The circuit 21 may also receive at an input 23, which is an error signal coming from a device (not shown) for checking the transverse margins of the sheets.

Figure 5:
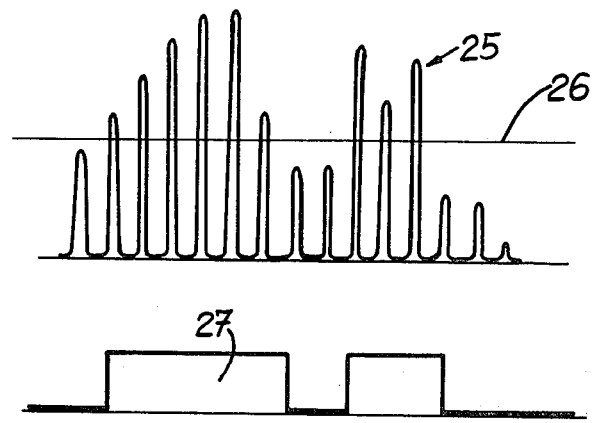
FIG. 5 illustrates the formation of a counting signal.

The camera 7 is a commercially available device. It is equipped with an internal comparison system having an adjustable threshold. This threshold may be modified by means of a potentiometer. The camera is also associated with a circuit 24 ensuring self-adjustment of the threshold to the level of illumination of the margins of the sheet. FIG. 5 shows diagrammatically the formation of the useful signal which will be referred to as the DATA signal. The amplitude of the video signal 25 is compared with the level of the adjustable threshold 26, the envelope of the peaks in the video signal determining the DATA or authorisation signal. The DATA signal is "1" when the amplitude of the video signal is greater than the threshold. The DATA signal is used to inhibit or not inhibit the counters and thus to count the number of photodiodes generating a signal above the threshold. The measurement of the margin is thus based on counting the number of photodiodes sampled whilst the DATA signal is "1".

The principle of operation of the apparatus will be described for a camera by means of the diagram illustrated in FIG. 7. The control logic 14 generates a first initiation scanning, then waits for an integration time $t_o$ and controls the measurement scanning. The video signal is compared with the threshold 26 and the diodes "seeing" the margin are counted by the first counter 15. The number of diodes counted N is compared with a minimum number Nmin by the comparator 17 and with a maximum number Nmax by the comparator 18. Nmin and Nmax determine the tolerance limits and are supplied by the DATA preselection circuit 20. The second counter 16 counts the difference, in absolute value, between the numbers of diodes counted at each end of the margin. This difference is sent to a comparator 19 which compares the value measured with a reference value N' supplied by the circuit 20. The value N' is the maximum admissible value, and thus comparator 19 acts to check parallelism. The results from the various comparisons are sent to the circuit 21 which thus determines whether or not the sheet checked will be rejected. With the assistance of known means, for example a photoelectric cell, two signals PG1 and PG2 are produced (FIG. 7). The signal PG2 indicates the beginning of the sheet arriving in front of the camera lens and initiates the measuring process, whereas the signal PG1 controls the initiation scanning and sets a delayed actuation system in the control logic 14 for the measurement scanning. From the pulses PG1 and PG2, the delayed actuation system makes it possible to obtain the signals $\overline{\text{CLEAR 1}}$ and $\overline{\text{CLEAR 2}}$, the variable duration $t_o$ of the integration time, as well as the control signals S for starting up the camera. The duration of scanning is determined by an ENABLE signal.

The measuring apparatus will now be described in more detail by means of the block diagram shown in FIG. 8 and of the corresponding circuits illustrated in FIGS. 9 and 10. The block diagram has been completed by the circuits associated with the second camera 7'. In the block diagram of FIG. 8, the block 25 corresponds to the combination of the blocks 15, 17 and 18 of FIG. 6, whereas the block 26 corresponds to the combination of the blocks 16 and 19. The signals coming from the camera 7 are applied to the circuit 27 for processing the DATA signal by means of an interface 28. This block diagram also shows the delayed actuation control circuit 29. Associated with the second camera 7' are the circuits 24' to 28' respectively identical to the circuits 24 to 28. The data preselection circuit 20 is connected by the lines 30 and 31 to a computer which controls the system by means of an adequate program.

Figure 9:
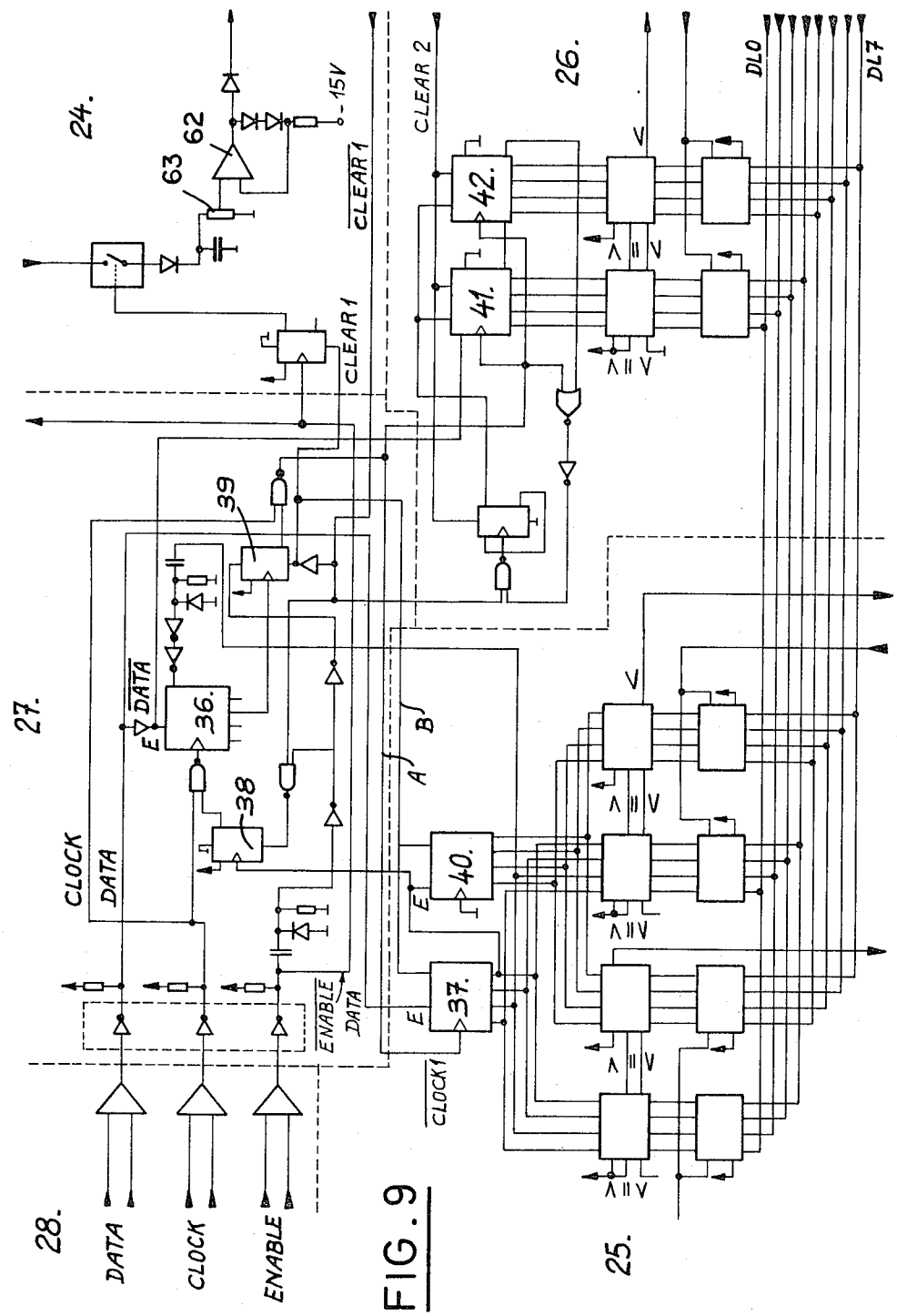
FIGS. 9 and 10 are electrical wiring diagrams for the block diagram shown in FIG. 8.
Figure 10:
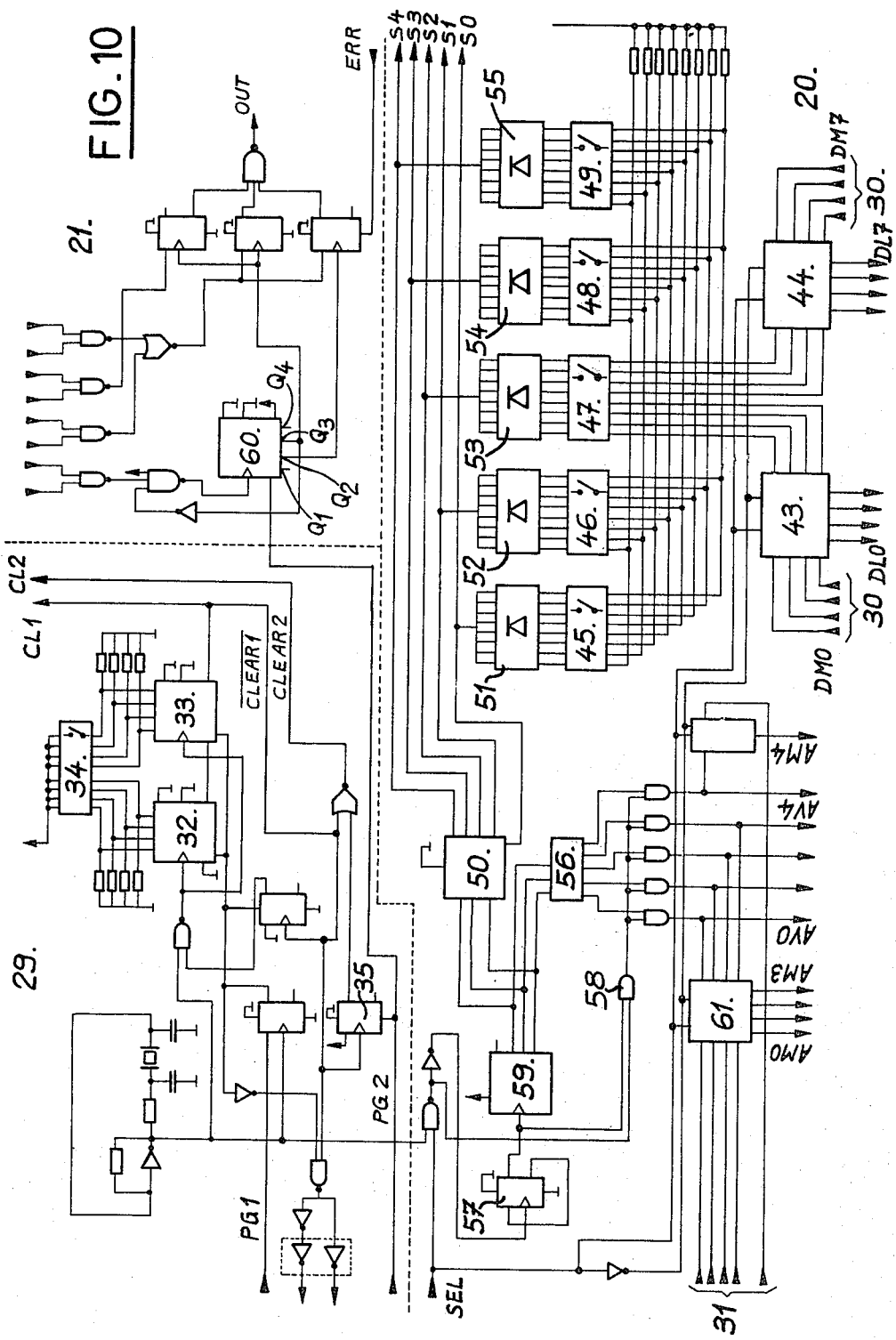

Reference will now be made to FIGS. 9 and 10. As above-mentioned, the delayed actuation circuit 29 makes it possible to obtain the signals $\overline{\text{CLEAR 1}}$ (CL1) and $\overline{\text{CLEAR 2}}$ (CL2), the variable duration $t_o$ of the integration time as well as signals S for controlling the camera, from the control pulses PG1 and PG2. This circuit essentially comprises two counters 32 and 33 which are initiated by signal PG1 at a value preselected by eight circuit-breakers 34. They subtract until they reach the state zero, thus determining the integration time $t_o$ and generating the pulses CLEAR 1, CLEAR 2 and S. The pulse CLEAR 2 only appears after a pulse PG2 which re-sets the flip-flop 35 to zero. The time $t_o$ is preselected in binary form at the circuit-breakers 34 with 100 $\mu$s for unity. The clock frequency is 10 kHz. The pulses S controlling the camera are an OR function of PG1 (initiation scanning) and CLEAR 1 (measurement scanning).

The DATA signal is processed by the circuit 27. The pulses, i.e. the outputs of the photodiodes, are counted by the circuit 25. The circuit 27 comprises a counter 36 of "LESS" diodes and the circuit 25 comprises two counters 37 and 40 of "MORE" diodes in series. The "MORE" diodes are the diodes receiving a video signal greater than the threshold, whereas the "LESS" diodes are the diodes receiving a video signal less than the threshold. The inputs E (ENABLE) of the counters 36 and 37 are respectively connected to the $\overline{\text{DATA}}$ and DATA signals. The counter 36 of "LESS" diodes is set by a flip-flop 38 when the counter 37 has counted eight "MORE" diodes. As soon as four "LESS" diodes have been counted, i.e. as soon as one is outside the margin, the counter 37 of "MORE" diodes is inhibited by a flip-flop 39 until the next measurement scanning.

The apparatus takes into account possible defects, such as black spots in the margin: if less than four "LESS" diodes are counted, the counter 36 is automatically re-set to zero by a pulse generated by means of the counter 37 of "MORE" diodes every two "MORE" diodes. The end of scanning inhibits the counter 36 by the flip-flop 38 owing to a pulse generated by the $\overline{\text{EN-ABLE}}$ signal. The function of the $\overline{\text{CLEAR 1}}$ signal is to initiate the device at the beginning of each measurement scanning.

The "MORE" counters 37 and 40 may be inhibited by the flip-flop 39 as well as the DATA signal. The circuits 25 and 27 are connected by two lines A and B. The line A sets the counter 36 of "LESS" diodes, whereas the line B re-sets the counter 36 to zero if less than four "LESS" diodes have been counted. The number N of diodes counted is compared with the values Nmin and Nmax. The CLEAR 1 signal re-sets the two "MORE" comparators 37 and 40 to zero at the beginning of each measurement scanning.

The circuit 26 checks the parallelism. It comprises two counters 41 and 42. At the time of the first measurement, these two counters count the value $N_1$, i.e. the number of diodes counted at B (FIG. 1) then, at the time of the second measurement, they subtract the new value $N_2$ (point A). If $N_2$ is greater than $N_1$, a detection of the state "zero" causes a re-count in order to always obtain the absolute value $|N_2-N_1|$. This value is compared with a reference value.

The circuit 24 makes it possible to have a self-adjusting threshold, i.e. adjusting automatically to the illumination of the margins of the sheet. This circuit provides a superimposition on the fixed threshold of the camera, of a variable threshold depending on the VIDEO signal. The height of the variable threshold with respect to the video signal is adjusted by means of a potentiometer 63, by means of which part of the VIDEO signal is sampled, which is applied to an amplifier 62. If the amplitude of the VIDEO signal drops as a result of a reduction in the intensity of the illumination, the level of the variable threshold drops by the same proportion, thus guaranteeing normal detection of the value of the margin.

Figure 8:
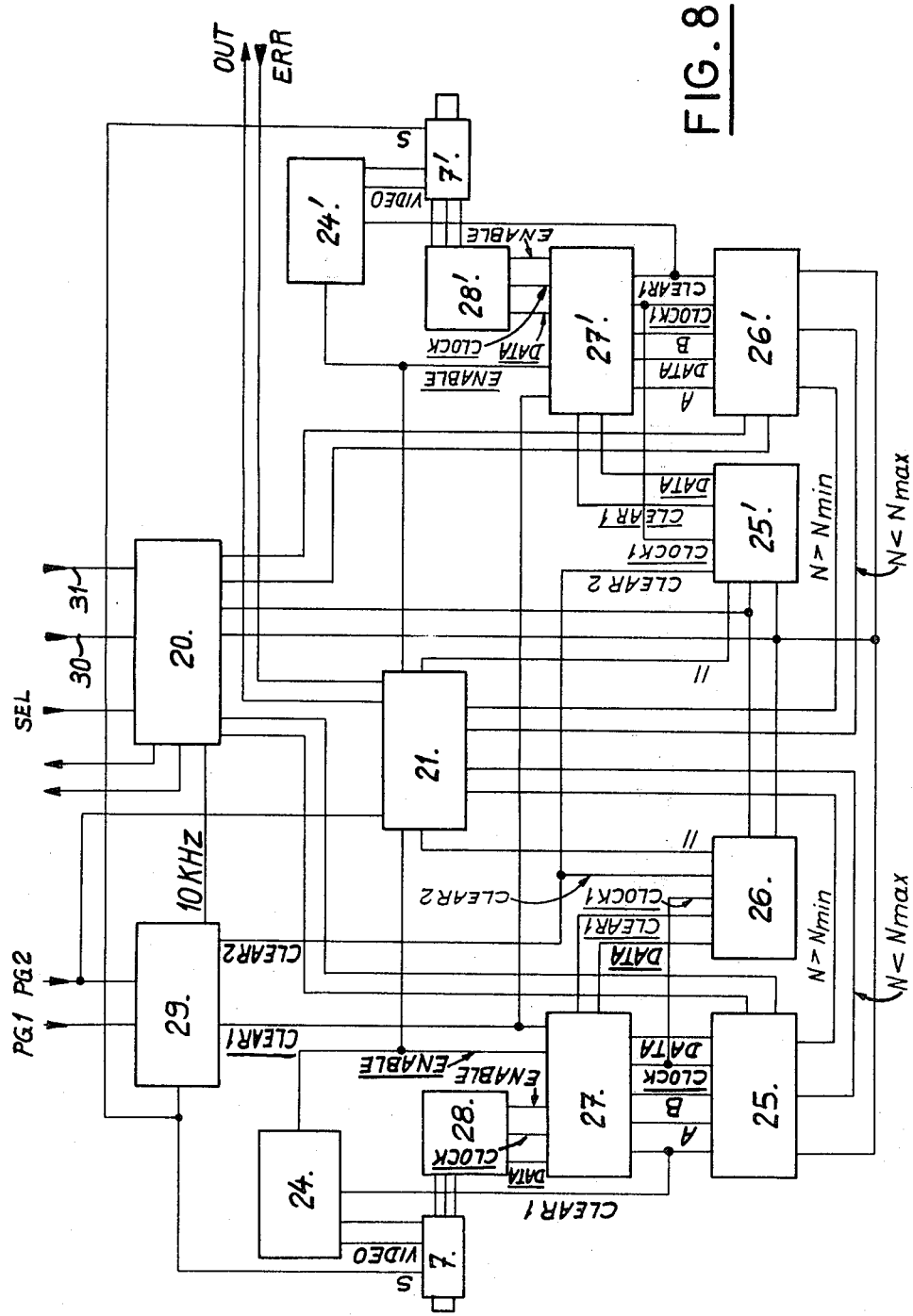
FIG. 8 is a complete block diagram of the apparatus.

The data pre-selection circuit 20 has two separate modes of operation, either a computer mode or a manual mode, depending on the state of the signal SEL (FIG. 8). The signals corresponding to each of these modes are selected by means of two four-bit selectors 43 and 44.

When the circuit 20 operates by the computer mode, the computer supplies charging pulses on the lines 31, as well as the corresponding data DM0 to DM7 on the lines 30.

In the manual mode, the values are preselected on five multi-contactors 45, 46, 47, 48 and 49, each multi-contactor being selected in turn by a de-multiplexer circuit 50 through five diodes 51, 52, 53, 54 and 55. The lines S0 and S4 thus pass periodically from a state of high impedance to the state 0 V. At the same time, a decoder 56 combined with a logic arrangement 57, 58 supply charging pulses AV 0 to AV 4 used in the case of the manual mode of operation. With the computer mode, it is the pulses AM 0 to AM 3 coming from the line 31 via a selector 61 which have a determining effect. A counter 59 constantly incremented facilitates cyclic charging.

The function of the circuit 21 (output processing) is to interpret the results of the three comparisons coming from each camera for each measurement. The operation is controlled by a counter 60 incremented by the $\overline{\text{EN-ABLE}}$ signal for the end of scanning. The counter 60 comprises four outputs Q1 to Q4. Q1 and Q2 are used to memorize the results of the comparisons after each measurement scanning. The output signal OUT is in principle also dependent on the result of an operation for checking the transverse margins ERR which is the subject of a parallel patent application. The signal OUT is available after all the measurements of one sheet have been carried out and until the time when the measurements of the following sheet begin.

What I claim is:

1. In a method of checking the width and parallelism of margins following the centering of a print on a support, the steps of moving the support in front of an opto-electronic reading device in a direction parallel to the margins while illuminating said support and print, said reading device being positioned to view a margin of said support and said print by reflected light and comprising an array of photo-sensitive elements distributed in a linear manner transversely with respect to the direction of movement of said support and a camera for focusing on said array of photo-sensitive elements an image of a marginal portion of said support and said print, activating first counting means to make a first count of the number of said photo-sensitive elements of said reading device producing a signal greater than a threshold level as a first portion of said support passes said reading devices, comparing the number of said elements counted with a first reference value, subsequently making a second count of the number of said elements of said reading device producing a signal greater than said threshold level as a second portion of said support passes said reading device, comparing the number of elements counted in said second count with said reference value and comparing the difference between the number of elements counted in said first and second counts respectively with a second reference value, triggering second counting means by said first counting means, when said first counting means has counted a predetermined number of photosensitive elements producing a signal greater than said threshold level, to make a count of photosensitive elements producing signals less than said threshold level, and inhibiting said first counting means when said second counting means has counted a predetermined number of photo-sensitive elements in order to prevent a black point in the margin from being interpreted as the margin of the print.

2. A method according to claim 6, in which a capacitor a connected in parallel with each of said photosensitive elements, and the charge of said capacitor is measured by integration of the photo-current during a predetermined and constant time in order to determine the photo-sensitive elements producing a signal greater than a threshold value.

3. Apparatus for checking the width and parallelism of margins following the centering of a print with respect to a support, comprising two opto-electronic reading devices, means for moving said support in front of said reading devices in a direction parallel to the margins, means for illuminating said support and print, said opto-electronic reading devices comprising an array of photo-sensitive elements distributed in a linear manner transversely with respect to the direction of movement of the support and a camera for focusing on said array of photo-sensitive elements an image of a marginal portion of said support and said print, first counting means for counting the number of said photo-sensitive elements of each of said photo-electronic reading devices producing a signal greater than a threshold level, means for activating said counting means to make a first count as a first portion of said support passes said opto-electronic reading devices and for subsequently making a second count as a second portion of said support passes said opto-electronic reading devices, means for comparing the number of said photo-sensitive elements of each of said opto-electronic reading devices counted with a first reference value and for comparing the difference between the number of said photo-sensitive elements counted in said first and second counts respectively with a second reference value, second counting means for counting the photo-sensitive elements producing a signal less than said threshold level and triggered by said first counting means, and means for inhibiting said first counting means when said second counting means has counted a predetermined number of photosensitive elements in order to prevent a black point in the margin from being interpreted as the margin of said print.

4. Apparatus according to claim 3, in which said photo-sensitive elements of said opto-electronic reading devices comprise photodiodes.

5. Apparatus according to claim 3, in which each of said opto-electronic reading devices further comprises a comparison device providing an adjustable threshold level which is self-adjusting in response to the illumination of the margins by said illuminating means.

6. Apparatus according to claim 3, in which said activating means comprises control logic circuit means comprising means for sensing the leading edge of said support arriving in front of said camera and thereupon activating said counting means to make said first count and delayed actuation means for subsequently activating said counting means to make said second count.

7. Apparatus according to claim 3, in which said comparing means comprises registers containing the reference values, a first comparator for comparing the number of diodes counted with a reference value corresponding to the maximum authorized margin width, a second comparator for comparing the number of diodes counted with a reference value corresponding to the minimum authorized margin width, and a third comparator for comparing the difference between the numbers of diodes counted in said first and second counts respectively with a reference value corresponding to a tolerance of non-parlllelism.

* * * * *